United States Patent Office 3,070,795
Patented Dec. 25, 1962

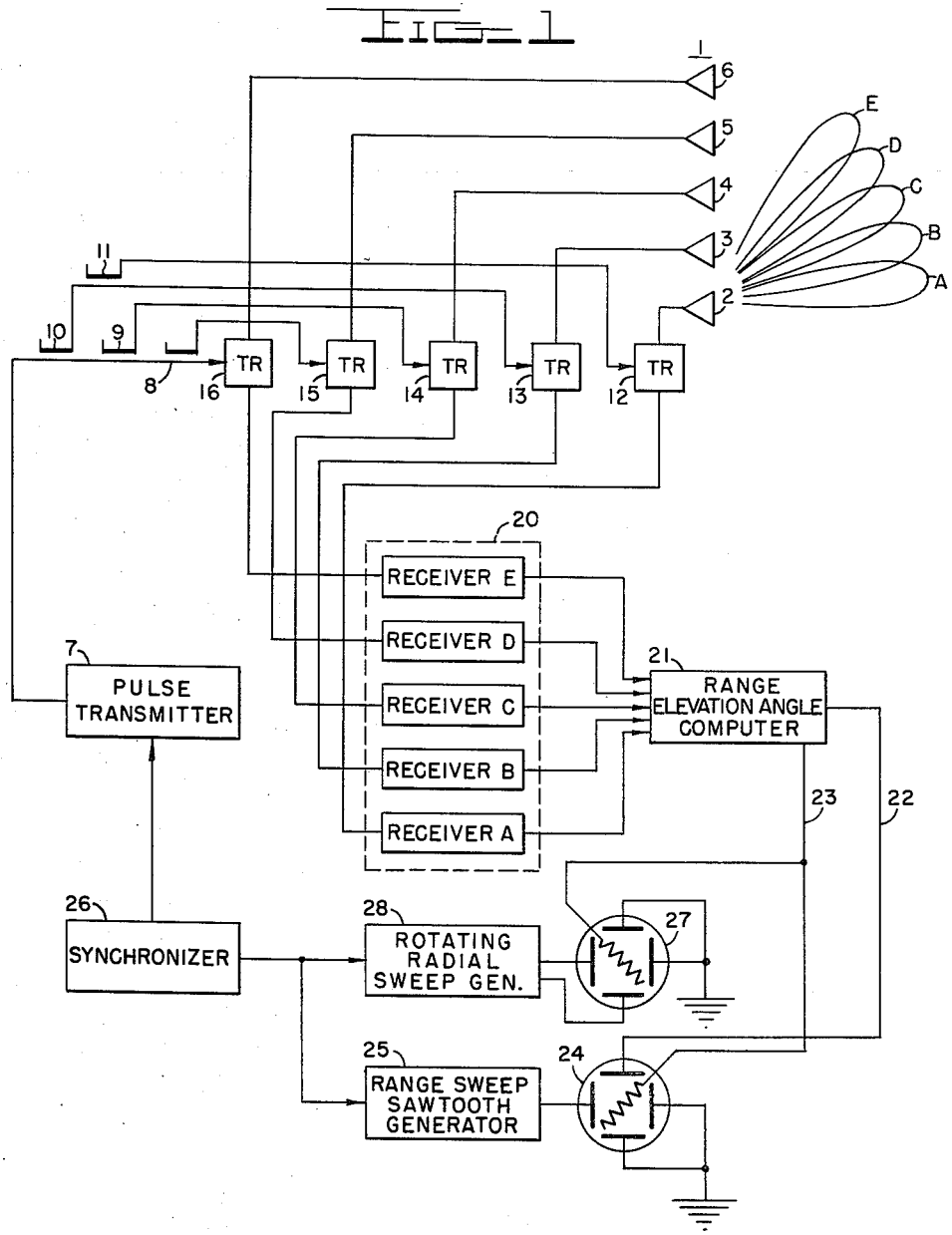

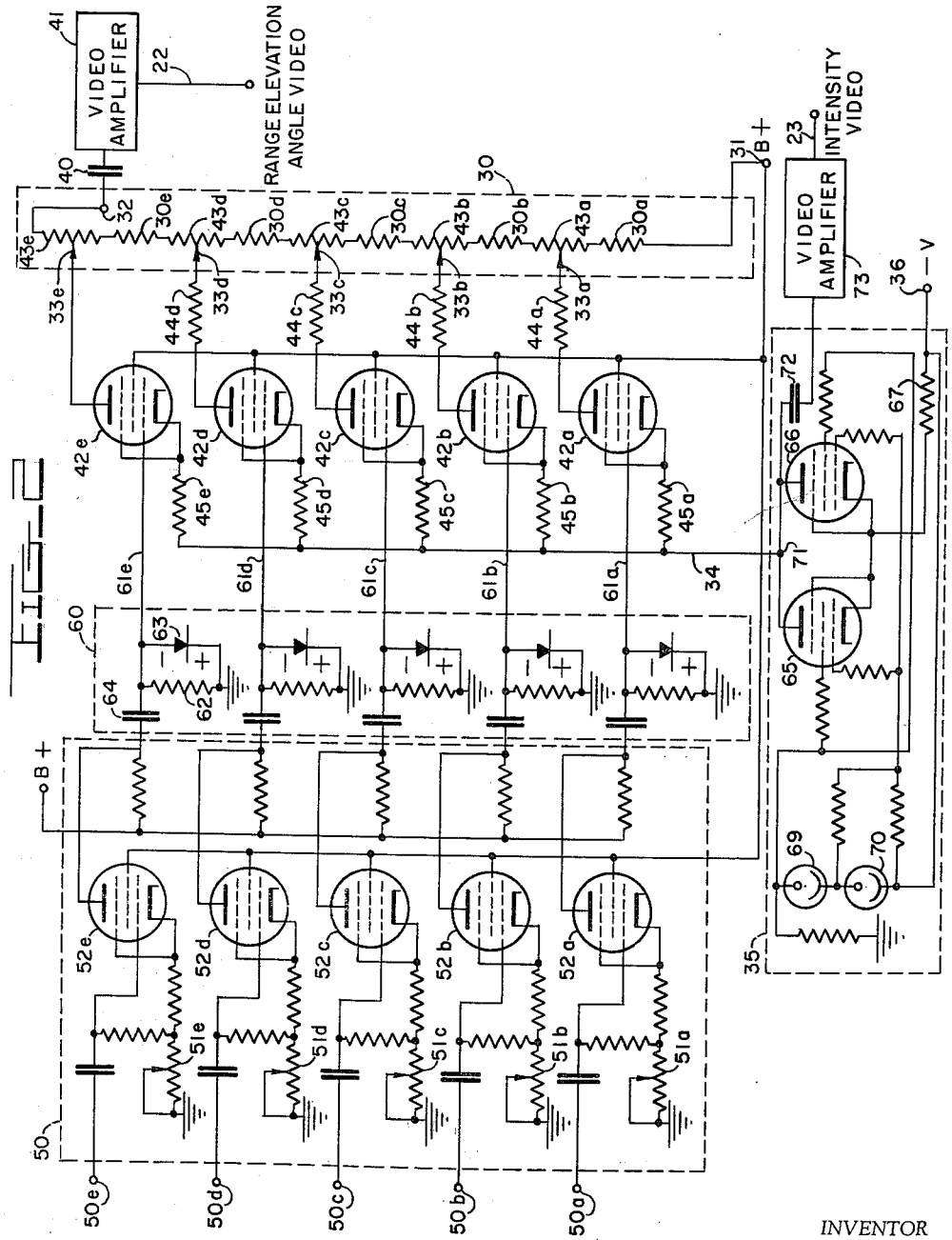

3,070,795
ELEVATION ANGLE COMPUTER FOR STACKED BEAM HEIGHT FINDING RADAR SYSTEM
Torrence H. Chambers, % Naval Research Laboratory, Washington 25, D.C.
Filed Jan. 25, 1954, Ser. No. 406,098
12 Claims. (Cl. 343—16)
(Granted under Title 35, U.S. Code (1952), sec. 266)

This invention relates to height finding radio locator apparatus of the stacked-beam type and more particularly to improvements in the target elevation-angle computer thereof.

The computer of the present invention is, in general, applicable to the system disclosed in the copending application to A. A. Varela, Serial No. 279,679, filed March 31, 1952, for Height Finding Radar System. This system is generally referred to as a stacked-beam height finding radar and basically includes a transmitter which radiates radio wave pulses that are directional in azimuth but substantially continuous in elevation, a plurality of directional receiving antennae arrange so that the individual beam patterns thereof are progressively displaced, or stacked, in elevation, a logarithmic receiver for each of the antennae, and a target elevation-angle computer that selects the beam pair between the axes of which the target is located and generates an output pulse of an amplitude indicative of the target elevation angle.

While the stacked-beam system referred to above theoretically affords true target elevation angle information for elevation angles between the axes of the uppermost and lowermost beams, several practical difficulties have been encountered therewith. Primarily these difficulties have arisen in connection with the method of and apparatus for computing target elevation angles from the information derived from the logarithmic receivers. Broadly the computer disclosed in the Varela application determines elevation angle on a beam pair basis, that is, the pair of adjacent beams in the stacked array is selected by comparing the sum signals of all adjacent beam pairs, responsive to which selection a pedestal pulse representative of that beam pair is generated. Simultaneously, the relative strengths of the signal received by the individual beams of the selected pair are utilized to generate an interpolation voltage for modifying the pedestal pulse in accordance with the position of the target relative to the axes of the selected beam pair.

A computer of the pedestal-plus-interpolation voltage type, however, requires complicated circuitry employing a considerable number of tubes and supplementary circuit components which results in a radar system large in size and weight whereby small installations, such as may be carried by aircraft or small ships, are impractical.

Another disadvantage of the pedestal-plus-interpolation computer is that it is difficult to obtain accurate and positive target position resolution when the target appears at or near a beam center. This is due primarily to the switching from one pedestal pulse to the next higher, or lower as the case may be, which depends upon a selector circuit distinguishing between the vanishingly small difference in the corresponding beam pair sum signals as the target crosses a beam center. If the switching action is not precise, the interpolation process becomes quite erratic due to the deleterious effects of minor lobes on the antenna patterns. Moreover, the maintenance of equalized gain for the interpolation voltages for the several channels requires a complex monitor system and setup procedure which adds to the size and complexity of the system and further reduces the overall utility thereof.

It is, therefore, an object of the present invention to provide in a stacked-beam locator system an improved elevation-angle computer that utilizes circuitry which is stable and reliable in operation while yet being compact, light in weight and simple in design.

Another object of the present invention is to provide in a stacked-beam locator system a computer which eliminates errors due to minor lobes on the antenna patterns of the system.

A further object is to provide in stacked-beam locator systems an elevation-angle computer which operates according to the center-of-gravity principle.

Still another object is to provide a center-of-gravity computer for stacked-beam locator systems wherein computation is performed utilizing only the two or three beams producing the strongest signals.

A still further object is to provide a computer for stacked-beam locator systems wherein computation is based on a single, effective, elevation-angle voltage.

These objects are attained according to the present invention by providing a computer including a video amplifier for each of the logarithmic receiver channels of the stacked-beam system referred to above, the combination of the video amplifier and log receiver in each channel producing an instantaneous output proportional to the log of the received signal on the corresponding beam and at a peak amplitude determined by the preset gain in the amplifier. A series of overdriven peak select tubes, equal in number and coupled to the video amplifiers, are supplied through a constant current source which, in combination, act substantially in the nature of a common cathode follower. The degeneration effected by the constant current source causes a dynamic voltage representative of the average signal strength in the strongest beams to be subtracted from the peak select tube input signals whereby the weak signal peak select channels are blocked and the output currents of the strong signal channels are caused to sum to a constant. An output network coupled to the peak select tubes weights and sums the output signals of the selected channels to produce a single output signal proportional in amplitude to the center of distribution in elevation angle of the instantaneous energy received on the beams presenting the strongest signals to the system.

Other objects and advantages of the present invention will become apparent from the following detailed description when read in conjunction with the accompanying drawings in which:

FIGURE 1 is a block diagram of a stacked-beam locator system to which the present invention is applicable.

FIGURE 2 is a schematic diagram of the elevation-angle computer shown in block in FIGURE 1.

With reference to FIGURE 1 there is shown a simplified block diagram of a stacked-beam height-finding system of the type described in the aforesaid copending application Serial No. 279,679 to which the principles of the present invention may be applied. The system as herein illustrated provides for five overlapping receiver beams A, B, C, D and E which are fanned in the manner indicated in elevation angle while being directional in azimuth, the beams representing generally the response pattern of the antennae array schematically designated at 1, and specifically the respective patterns of individual antenna elements 2, 3, 4, 5 and 6. Array 1 may be any directional antenna means which produces overlapping beam patterns, the individual beam patterns preferably approximating as nearly as possible an exponential function as the direction angle deviates from the beam axis. Although most directional antenna beam patterns are exponential in character near the beam center, an array utilizing a split paraboloid reflector is preferred since the beam pattern exponential characteristic extends to direction angles quite removed from the beam center thereof. Thus, array 1 may typically comprise a split paraboloid reflector having five stacked feeders, whereby continuous coverage from the lowermost to the uppermost beam in the vertical plane is afforded according to the copending application aforesaid.

Energy from pulse transmitter 7, which serves the function of generating a series of time-spaced pulses to be radiated into space, is fed through directional power dividers 8, 9, 10 and 11, conventional TR boxes 12, 13, 14, 15 and 16 to array 1 to provide the radiated electromagnetic field in the desired distribution; the power may be either graduated or equally divided in the respective field patterns A, B, C, D and E as illustrated in FIGURE 1. It is to be understood however, that any suitable means of providing the required field distribution may be employed, the requirements imposed by design considerations controlling the specific form of the transmitting apparatus. For example, the number of beams may be increased or decreased, and individual transmitting and receiving antennae, might be preferred according to the purpose for which the system is designed.

Echo signals appearing at the individual elements 2 to 6 in array 1 are respectively received and amplified logarithmically by separate receiver channels in the system receiver, generally designated at 20. The individual receivers A to E, which in combination comprise logarithmic receiver 20, may take any of the conventional forms well known in the art, logarithmic reception being preferred to compress the wide range of signal amplitudes to be handled. The video output of receiver 20 is fed to elevation-angle computer 21, to be later described, which reduces the several signals supplied by the antennae of array 1 in response to the incoming energy to a common channel intensity signal at line 23 and a video elevation signal at line 22. Both of these signals occur simultaneously at a time after the transmission of a pulse from transmitter 7 proportional to the range of the pulse energy reflecting object giving rise to the received energy.

The video signal at line 22, will have a magnitude which is proportional to the elevation angle of the reflected energy from the object being located.

For visually presenting range-elevation-angle information, cathode ray tube 24, preferably of the electrostatic type, is provided to which the range-elevation-angle signal from line 22 is applied. In the usual manner, a range time base for tube 24 is obtained by applying to the horizontal deflection plates thereof a range sweep sawtooth wave from sawtooth generator 25, coupled to conventional sync pulse generator 26 which provides the keying control function for synchronizing the initiation of the transmitter pulse and the indicator range sweep. With the provision of a vertical scale on the face of tube 24, calibrated in terms of elevation angle, the application of the elevation video signals from line 22 to the vertical deflection plates and intensity signals from line 23 to the intensity grid thereof affords a visual presentation wherein the elevation video signal appearing on the face of tube 24 is indicative of the elevation angle of the received energy wave, and hence, indicative of the elevation angle of the object being located. In addition range-azimuth indications may be obtained by applying intensity signals from line 23 to the intensity control electrode of conventional plan position (PPI) indicator 28, the electron beam thereof being caused by rotating radial sweep generator 28, also synchronized by sync pulse generator 26, to trace a radial and rotating path in the usual manner.

Turning now to FIGURE 2 there is schematically illustrated an elevation-angle computer which operates according to the center-of-gravity principle to derive from the output signals of the several logarithmic receiving channels a single output video pulse which is proportional to the elevation angle of the energy reflecting target. In order to illustrate most clearly the application of the center-of-gravity principle of operation to the present invention the computing elements of the circuit will first be described. A resistor network generally designated at 30, includes resistors 30a through 30e which are coupled in series, one terminal 31 of the series being connected to a source of positive potential (not shown) and the other terminal 32 being the output terminal both of the resistor series and of the computer. A series of tap-points 33a through 33e each associated with a respective resistor 30a through 30e are coupled to a common line 34 which leads to a source of relatively low or negative potential connected to terminal 36 through a source of constant current generally indicated at 35. The number of resistors in series in the network 30 and the associated tap-points therefor corresponds to the number of beams in the stacked array of the system. In addition the magnitudes of the resistors are such that the total resistance between terminal 31 and a given tap-point is proportional to the elevation angle of the beam to which the tap-point corresponds. For example, if the axes of beams A, B, C, D and E were respectively at elevation angles of 2°, 6°, 10°, 14° and 18° then resistors 30a through 30e may have respective values of 50 ohms, 100 ohms, 100 ohms, 100 ohms and 100 ohms. It will be observed then that the resistance between terminal 31 and tap-point 33a is 50 ohms which corresponds to the 2° angle of elevation of beam A whereas the resistance between terminal 31 and tap 33b is 150 ohms, corresponding to the 6° angle of elevation of beam B.

The computer determines the elevation angle of the energy received by the system by implementing the equation:

$$E_0 = I r_{cg} \quad (1)$$

where $E_0$ is the elevation-angle video voltage,
$I$ is a constant current, and
$r_{cg}$ is a resistance proportional to the elevation angle of the target.

With reference to the computer in general, $E_0$ is the voltage level which terminal 32 drops below the voltage of the source at terminal 31 when an incoming pulse is received by the system. The constant current $I$ term of the equation is simply the predetermined value of current which constant current source 35 permits to be drawn from the said source of potential. It remains therefore to evaluate the term $r_{cg}$.

Assuming, as will be shown, that the current withdrawn at each of the tap-points is proportionally representative of the relative signal strength received on the beam which corresponds to the given tap-point, then the total effective resistance of the network with respect to point 32 will be:

$$\frac{\Sigma R_\theta I_\theta}{\Sigma I_\theta} \quad (2)$$

where $R_\theta$ is the resistance from terminal 31 to any given tap-point, and
$I_\theta$ is the current withdrawn at the given tap-point.

It will be observed that Equation 2 is of the form of of the well-known formula for the summation of moments to determine the center-of-gravity of a system. The dimensions of Equation 2 indicate the resultant to be in the nature of a resistance which accordingly is designated $r_{cg}$.

Simplifying Equation 2, $\Sigma I_\theta$ is merely the total current flowing through the network 30 which, by virtue of constant current source 35, equals $I$. In addition, the computer includes a peak select circuit, to be hereinafter described, which limits computation to the signals received on the two or three beams exhibiting the highest signal strengths. Expansion of Equation 2 accordingly yields:

$$\frac{R_a I_a + R_b I_b (+ R_c I_c)}{I} \quad (3)$$

where $R_a$ is the total resistance to the lowermost tap-point passing current, $I_a$ is the current withdrawn at the tap-point associated with resistance $R_a$, $R_b$ is the total resistance of the next higher actuated tap-point, and $I_b$ equals the current withdrawn at the tap-point associated with resistance $R_b$ etc.

For simplification, the term $(R_c I_c)$ is neglected as in the case where computation is performed only on two beams. Designating the resistance between the two activated tap-points as $R_{ab}$, the left hand side of Equation 3 may then be writen:

$$\frac{R_a I_a + (R_a + R_{ab})I_b}{I} \quad (4)$$

or $$\frac{R_a(I_a + I_b) + I_b R_{ab}}{I}$$

Since $(I_a + I_b)$ equals the total current $I$, then $$r_{cg} = R_a + \frac{I_b}{I} R_{ab} \quad (5)$$

Rewriting Equation 5:

$$R_a I + R_{ab} I_b = I r_{cg} \quad (6)$$

which is seen to be identical to the term on the right hand side of Equation 1.

Relating Equations 5 and 6 to the resistor network of FIGURE 2, if beams A and B present the strongest signals to the receivers, then $R_a$ will be equal to resistance 30a, $R_{ab}$ will be equal to resistance 30b, and $I_a$ and $I_b$ will be equal respectively to the current withdrawn at tap-points 33a and 33b, it being understood that the total current I flows through resistance 30a whereas the current flowing through resistance 30b is equal to $I_b$. Since the theorem of superposition clearly applies, in response to a received signal the various voltage drops in the resistance network as determined by Equations 5 and 6 will be reflected at output terminals 32 as a voltage drop $E_0$ with respect to the potential of point 31.

It is seen, therefore, that the effective resistance of the resistor network is $r_{cg}$ which is varied in accordance with the variation of the currents withdrawn at the tap-points. Furthermore, by requiring that the current at each tap-point be representative of the signal strength of the energy received on the associated beam with the sum of the currents constrained to equal a constant, the conditions imposed by Equation 1 are satisfied whereby the resultant voltage drop $E_0$ is proportional in magnitude to the center of distribution in elevation angle of the instantaneous energy received on the beams presenting the strongest signals to the system. For the example given above the energy reflecting target would be located somewhere between the axes of beams A and B since it was assumed that only tap-points 33a and 33b, corresponding to beams A and B, draw current.

Output pulses of the computer consist of the voltage drops $E_0$ at terminal 32 which are fed through coupling condenser 40, amplified as by conventional video amplifier 41 and passed by line 22 to the cathode ray tube 24 to provide the range-elevation-angle deflection voltage as has been described.

To provide for the selection of the two or three strongest beams and to withdraw at each tap-point a current which is representative of the signal received on the corresponding beam, the tap-points are respectively connected to the plates of a series of vacuum tubes 42a through 42e, hereinafter referred to as peak select tubes. These tubes preferably are sharp-cutoff pentodes, as shown, which have as nearly a linear transfer characteristic as possible, for reasons to be made apparent hereinafter. As thus connected resistance 30a constitutes the plate resistor of tube 42a, resistances 30a and 30b comprise the plate resistance of tube 42b, etc., and the source of positive potential at terminal 31 provides the plate supply potential for the peak select tubes in parallel. Potentiometers 43a through 43e are preferably inserted in series intermediate the network resistors 30a through 30e in order to compensate for the tolerances allowed in commercially available fixed resistors, the movable arms of the potentiometers comprising the tap-points 33a to 33e respectively. Additional plate resistors 44a through 44d are provided between the tap-points and the plates of tubes 42a through 42d to equalize the plate circuit resistance with respect to terminal 31 for each of the peak select tubes. These latter resistances may be omitted where the peak select tubes are pentodes, as shown, since variations in the plate voltages for such tubes has negligible effect on the operation thereof. However, if it be desired to further reduce the total weight of the computer, dual triodes may alternatively be utilized as the peak select tubes, each triode section in the dual triode tube performing the function of one peak select tube. In such case equalization of plate circuit resistance is desired whereby to balance the plate voltage drop in the case where two or more of the peak select tubes should carry equal current.

Connected respectively to the cathodes of the peak select tubes are cathode resistors 45a through 45e, the cathode resistors being of equal value and joined at the low potential ends thereof to common cathode line 34 and hence to constant current source 35. Cathode resistors 45a through 45e in combination with constant current source 35 in the cathode circuit of the peak select tubes render the peak select tube circuit mutually degenerative. Accordingly, voltage developed in the cathode circuit of one of the tubes in response to current flow therein reflects as a negative grid bias on the remainder of the tubes. As the magnitude of the voltage feedback in part depends upon the value of the cathode resistors 45a to 45e, these resistors determine the comparative input signal strengths between the peak select tubes which are blocked and the tubes which conduct. In other words, the magnitude of the cathode resistors predetermine the peak select operation by degenerative action, as will be described. In practice the value of the cathode resistors are empirically chosen to establish a peak select operation which allows only the two or three tubes having the strongest input signals to conduct and in general is several times larger than $$\frac{1}{g_m}$$

of the tubes.

The control grids of the peak select tubes are adapted to receive the incoming signals on the beams associated with the channels in which the tubes are respectively positioned. For this purpose the output of the logarithmic receiving channels A through E are respectively fed to terminals 50a through 50e, amplified by conventional video amplifiers generally designated at 50, passed through D.C. restorers generally designated at 60 and thence by lines 61a to 61e to the control grids of the peak select tubes. Amplifier section 50 includes a separate amplifier for each of the channels and serves to raise the input video signal level from the logarithmic receiver channels to a maximum predetermined level dependent upon the maximum voltage level desired to be fed to the computer. While any suitable amplifier will suffice, it is preferred that each of the individual amplifier units include means for controlling the gain thereof whereby equalized outputs may be obtained. In FIGURE 2 the gain control for the amplifiers is illustrated as variable degenerative resistors 51a through 51e connected in the cathode circuits of amplifiers tubes 52a through 52e. Video amplifier section 50 additionally serves the purpose of inverting the polarity of the signals from logarithmic channels 20 whereby positive pulses are fed to the individual restorers in D.C. restorer section 60 which serves to clamp the input pulses to the peak select tubes to a fixed reference level at ground. D.C. restorer section 60 includes a series of individual units which are conventional in the art, each unit including for example, the usual RC combination of a condenser 64 to which input pulses are fed in parallel and a resistance 62 with a crystal diode 63 shunting the output side of condenser 64 to ground to thus prevent the grids of the peak select tubes from swinging negative relative to ground.

As alluded to hereinbefore, constant current source 35 maintains the current withdrawn from the source of positive potential at terminal 31 through the computer circuit at a constant value. Typically constant current source 35 may be a constant current pentode circuit which includes a pair of pentode tubes 65 and 66 in parallel, that is, the plates and the cathodes of the pentodes being directly connected with the plates being connected at point 71 to line 34 and the cathodes being returned to a source of negative potential at terminal 36 through a common cathode resistor 67. VR tubes 69 and 70 are provided to stabilize through a resistor network the screen grid-to-cathode and control grid-to-cathode potential of the pentodes in parallel in the usual manner. Ordinarily a single pentode would be sufficient as a constant current source, however, due to the current requirements of the several peak select tubes in parallel a pair of pentodes are provided whereby to increase the current capacity thereof. It will be understood that with the screen and control grid potential of the constant current pentode being stabilized, variations in the plate voltage at point 71 will have negligible effect on the current drawn by the tubes. The voltage at point 71, however, will vary in accordance with the signal inputs to the peak select tubes, the pulses thereby obtainable being fed through coupling condenser 72, amplified by conventional amplifier 73 and passed to common intensity line 23 to constitute the intensity pulses in the system.

In operation, for the theoretical static condition wherein no signals, either noise or incoming target signals on the beams A through E, are fed to the computer, the grids of all the peak select tubes will be substantially at zero potential due to the grounding thereof through respective resistors 62 in D.C. restorer 60. As the constant current source requires that constant current I be passed through line 34, each of the tubes will conduct and carry substantially the same value of current. With the current I being equally divided, each tube conducts at a low level and hence the grid-to-cathode voltage is near the cutoff point of the tubes fixing the voltage level of point 71 at a small positive potential. In this connection, it should be apparent that the combination of cathode resistors 45a through 45e and constant current source 35 in the cathode circuit of the peak select tubes provides a circuit which acts as a cathode follower device, that is, the voltage at point 71, hereinafter designated as $E_a$, and at the cathodes of the peak select tubes will tend to follow the voltage variation of the peak select tube grids.

Assuming a target appears near the axis of one of the beams, for example beam B, then the energy pulses generated by transmitter 7 and radiated by antenna array 1 will be reflected and received as a strong echo pulse at antenna element 3. The pulse is then logarithmically amplified by receiver B, inverted and further amplified by video amplifier 52b, clamped to a minimum zero level by the appropriate unit in D.C. restorer section 60 and applied as a positive pulse to the grid of peak select tube 42b. In the same manner pulses at lesser peak amplitudes are coincidently applied to the peak select tubes in the adjacent channels, the relative amplitudes of such pulses depending upon the deviation in position of the target relative to the axes of the beams corresponding to the signal delivering receiver channels. As the target was assumed near the axis of beam B, however, the relatively strong pulse at the grid of tube 42b will cause this tube to assume at least the major part of the constant current I and, in addition, will raise the tube cathode potential and the voltage $E_a$ at point 71 by the cathode follower action.

The sharp rise in voltage $E_a$ at point 71 in response to the strong pulse at tube 42b is reflected as a negative bias at the grids of the remaining peak select tubes, tending to cut off current flow therein. The number of peak select tubes, and hence channels, which are blocked as a consequence of the change in voltage $E_a$ depends upon several factors. Considering first the nature of the voltage and current relationships in the computer circuit, the actual signal voltage existing on the grid of any arbitrary one of the peak select tubes shall be designated as $E_j$. With respect to that tube, however, the effective input voltage is decreased by the degenerative action of the voltage developed across the impedance represented by constant current source 35. Hence, the effective tube input voltage is then the residual voltage $(E_j-E_a)$ which remains after voltage $E_a$ is subtracted from the aforementioned grid signal $E_j$. The above, of course, holds for all of the peak select tubes because of the common cathode connection at line 34. Thus voltage $E_a$ subtracts from each of the grid input signals and for the tubes receiving weak signals, the resultant input voltage $(E_j-E_a)$ will be sufficiently negative to cut off conduction.

As the transfer characteristics of the peak select tubes is linear, the output of the tubes carrying current must be proportional to the input thereto. Constant current source 35 assures that the total output of the peak select circuit sums to a constant, hence the effective input to the peak select tubes carrying current must likewise sum to a constant. Accordingly, voltage $E_a$ must rise, in response to computer input pulses, to a level so that of the tubes receiving the stronger grid signals $E_j$ just sufficient tubes conduct whereby the sum of the effective tube input voltages adjusts to the predetermined constant, all other tubes being cut off. In general, therefore, voltage $E_a$ is a dynamic voltage which is uniformly subtracted from all of the input signals to the peak select tubes, resulting in cut-off of the weaker signals and summing to a constant of the residual tube input voltages of the selected channels. Stated mathematically:

$$\Sigma(E_j-E_a)=K \qquad (7)$$

where $E_j$ represents separately the input signals on the grids of the selected tubes;
$K=$ a constant.

As stated above the outpuot of each of the selected peak select tubes is proportional to the input $(E_j-E_a)$ thereto and since the sum of the tube effective input signals is constant, the sum of the tube output signals must likewise be constant. Considering the current drawn by the peak select tubes as the output thereof, the total current is obviously the constant I, as fixed by constant current source 35, which is distributed among the conducting two or three selected tubes. With respect to an arbitrary one of the conducting tubes, the current drawn, assuming a linear characteristic, is proportional to the tube input signal $(E_j-E_a)$. From Equation 7 it is seen that the tube input signal $(E_j-E_a)$ is a part of a constant K, hence, the current $(I_j)$ drawn by this tube must be the same part in the constant I. From the foregoing, it follows that:

$$\frac{I_j}{I}=\frac{(E_j-E_a)}{K} \qquad (8)$$

which gives the relationship between the current $(I_j)$ and the grid input signal $(E_j)$ for each tube. In view of Equation 8, illustrating the direct dependence in magnitude of $I_j$ on $E_j$, the computer satisfies the conditions imposed by Equations 2 and 6. Accordingly, resistor network 30 is effective, as has been described, to weight the output current in each of the selected peak select tubes to produce at terminal 32 an output pulse which is indicative of the elevation angle of the energy reflecting target. The output pulse will occur, of course, with a time delay after initiation of the transmitter pulse in accordance with the range of the target.

The constant K depends in part on the magnitude of cathode resistors 45a to 45e. An increase in the value of the cathode resistors increases the effective tube input voltages and hence increases K. In other words, increasing the cathode resistors increases the cathode voltage drop for the tubes carrying current which obviously decreases voltage E$a$. A decreases in voltage E$a$ reduces the negative feedback which increases the possibility of conduction in more tubes for a given set of grid signals. Conversely, decreasing the cathode resistor magnitude reduces the possibility of a channel receiving a relatively weak signal to conduct. Therefore, the initial selection of the value of the cathode resistors controls the number of beams on which computation is based, and preferably are chosen to have a value such that computation will be had on only the two or three strongest beams depending on target position. For example, for a target directly on the axis of beam B, computation should be had on beams A, B and C whereas for a target halfway between two beams, computation will be had only on the two including beams.

For the purpose of illustrating the relative magnitudes of the computer components, a computer constructed in accordance with the preferred embodiment shown in FIGURE 2 employed in conjunction with a seven beam height finding system wherein the beam axes were disposed at elevation angles of approximately 1.4°, 4.2°, 7.0°, 9.8°, 12.6°, 15.4°, and 18.2° respectively, seven computer channels each including a 6AH6 pentode as the peak select tube and a common plate supply of 150 v. at terminal 31. Cathode resistors 45 were chosen to have a value of 470 ohms as compared with the rated 9000$\mu$ mhos transconductance of the 6AH6 pentode. In the resistor network 30, resistor 30a was approximately 41 ohms while the remaining resistors were 82 ohms, with an additional 50 ohm range of adjustment as provided by potentiometers 43. For the constant current source 35, there is provided a pair of 6AU6 pentodes biased to produce a current of 16 ma., the cathodes of the tubes being returned through a 1500 ohm resistor 67 to negative potential source at terminal 36 of −300 volts. The gain of video amplifiers 50 was adjusted to provide a maximum positive voltage input of 30 volts to the grids of the peak select tubes.

It is understood that as dynamic voltage E$_a$ varies with the average signal strengths of the strongest beams, identical computation will be had regardless of overall signal strength input to the computer, except for the limiting factor of noise. Hence, insofar as the computer is concerned only the relative magnitudes of the instantaneous signals are of importance and the variation in signals due to far and near targets, for example, are disregarded.

The invention described herein may be manufactured and used by or for the Government of the United States of America for governmental purposes without the payment of any royalties thereon or therefor.

What is claimed is:

1. In a computer system which includes a plurality of signal delivering receiver channels receiving signals of random intensity and having a progressive order of significance, an impedance having respective taps consecutively arranged thereon in the order of significance of said receiver channels, one end of said impedance adapted to be coupled to a source of current, the value of impedance between said one end and each tap-point being proportional to the order of significance of the corresponding channels, means for withdrawing a constant value of current from said source through said tap-points, and means responsive to the relative output signal magnitudes of said receiver channels to apportion said constant current in accordance with said relative magnitudes among the tap-points associated with the receiver channels delivering the strongest signals.

2. In a direction angle computer for a target location system which includes a receiving antenna array exhibiting a plurality of beam patterns having coplanar axes angularly displaced in progression, a receiver channel for each beam, an impedance having a tap thereon for each beam, one end of said impedance adapted to be coupled to a source of current, the value of impedance between said one end and each tap-point being proportional to the angular displacement of the corresponding beam, means for withdrawing a constant value of current from said source through said tap-points, and means responsive to the relative output signal magnitudes of said receiver channels to apportion said constant current in accordance with said relative magnitudes among the tap-points associated with the beams on which relatively strong pulses are received.

3. In a direction angle computer for a target location system which includes a receiving antenna array exhibiting a plurality of beam patterns progressively displaced in elevation angle, a receiver channel for each beam, an impedance having a tap thereon for each of said beams, a source of current coupled to one end of said impedance, the value of impedance between said one end and each tap-point being proportional to the elevation angle of the corresponding beam, means for withdrawing a constant value of current from said source through said tap-points, and means responsive to the relative magnitudes of the instantaneous output signals of said receiver channels to apportion said constant current in accordance with said relative magnitudes among the tap-points associated with the beams on which relatively strong signals are received.

4. In a direction angle computer for a target location system which includes a receiving antenna array exhibiting plurality of beam patterns progressively displaced in elevation angle, a receiver channel for each of said beams, a resistor having one end thereof coupled to a source of potential, respective tap-points on said resistor corresponding to said beams, the value of resistance between said one end and each tap-point being proportional respectively to the elevation angle of the corresponding beam, a common return line for current withdrawn from said tap-points, a constant current source in said line for maintaining constant said current, and means responsive to the relative instantaneous output signal magnitudes of said receiver channels to apportion said constant current in accordance with said relative magnitudes among the tap-points associated with the beams on which relatively strong signals are received.

5. In a direction angle computer for a target location system which includes a receiving antenna array exhibiting a plurality of beam patterns progressively displaced in elevation angle, a receiver channel for each of said beams, a resistor having one end thereof coupled to a potential source, respective tap-points on said resistor corresponding to said beams, the value of resistance between said one end and each tap-point being proportional respectively to the elevation angle of the corresponding beam, a common return line for current withdrawn from said tap-points, a constant current source in said line for maintaining constant said current, and respective cathode follower means coupled between said tap-points and said line and responsive to the relative magnitudes of the instantaneous output signals of said receiver channels to apportion said constant current in accordance with said relative magnitudes among only the tap-points associated with the beams on which relatively strong signals are received.

6. In a direction angle computer for a target location system which includes a receiving antenna array exhibiting a plurality of beam patterns progressively displaced in elevation angle, a receiver channel for each of said beams, a resistor having one end thereof coupled to a source of potential, respective tap-points on said resistor corresponding to said beams, the value of resistance between said one end and each tap-point being proportional respectively to the elevation angle of the corresponding beam, a common return line for current withdrawn from said tap-points, respective cathode follower means coupled between said tap-points and said line, a constant current source in said line coupling the cathodes of said cathode follower means in parallel whereby to maintain constant said current and to render said cathode follower means mutually degenerative, said cathode follower means being responsive to the relative instantaneous output signal magnitudes of said receiver channels to apportion the constant current in accordance with said relative magnitudes among the tap-points associated with the beams on which relatively strong signals are received.

7. In a direction angle computer substantially as set forth in claim 6 wherein each of said cathode follower means includes an electron discharge tube having at least an anode, a cathode and a control grid, said anode being coupled to the corresponding tap-point, said grid being coupled to the output of the corresponding receiver channel, and said cathode being coupled to said line through a resistor of a value at least as great as the inverse transconductance of said tube.

8. In a direction angle computer for a target location system which includes a receiving antenna array exhibiting a plurality of beam patterns progressively displaced in elevation angle, a receiver channel for each of said beams, a resistor having one end thereof coupled to a source of potential, respective tap-points on said resistor corresponding to said beams, the value of resistance between said one end and each tap-point being proportional respectively to the elevation angle of the corresponding beam, a common return line for current withdrawn from said tap-points, respective cathode follower means coupled between said tap-points and said line being responsive to the relative instantaneous output signal magnitudes of said receiver channels to apportion said current among said tap-points in accordance with said relative magnitudes, a constant current source in said line coupling the cathodes of cathode follower means in parallel whereby to maintain constant said current and to render said cathode follower means mutually degenerative, and means rendering said respective cathode follower means individually degenerative for reducing the mutual degenerative characteristics thereof.

9. A direction angle computer for a target location system receiver which includes a receiving antenna array exhibiting a plurality of beam patterns progressively displaced in elevation angle comprising a receiver channel for each beam, respective computer channels coupled to said receiver channels including means causing the instantaneous output signals of said computer channels to sum to a constant, means responsive to the relative output signal magnitudes of said receiver channels to apportion the constant computer channel output in accordance with said relative magnitudes among the computer channels associated with the beams on which relatively strong signals are received, and means operative to weight respectively the computer channel outputs in accordance with the elevation angle of the corresponding beams and to sum the weighted outputs whereby to derive a signal proportional to the center of distribution in elevation angle of the instantaneous energy received by said system.

10. In a computer system which includes a plurality of signal delivering receiver channels receiving signals of random intensity and having a progressive order of significance, respective computer channels coupled to said receiving channels including means operative in response to the instantaneous output signals of said receiver channels to develop a dynamic cutoff signal and to subtract said signal from the respective computer channel inputs for blocking the channels having the weaker signal inputs thereto so that the residual inputs to the channels receiving strong signal inputs sum to a predetermined constant, the respective outputs of said computer channels being proportional to said residual inputs thereto, and means operative to weight the respective computer channel outputs in accordance with the order of significance of said receiver channels and to sum said weighted outputs.

11. In a computer system which includes a plurality of signal delivering receiver channels receiving signals of random intensity and having a processsive order of significance, respective computer channels coupled to said receiving channels including respective cathode follower means having mutually degenerative characteristics, said cathode follower means being responsive to the instantaneous output signals of said receiver channels to develop a dynamic cutoff signal and to subtract said signal from the respective computer channel inputs for blocking the channels having the weaker signal inputs thereto so that the residual inputs to the channels receiving strong signal inputs sum to a predetermined constant, the respective outputs of said computer channels being proportional to said residual inputs thereto, and means operative to weight the respective computer channel outputs in accordance with the order of significance of said receiver channels and to sum said weighted outputs.

12. In a center-of-gravity computer for a system which includes a plurality of signal delivering receiver channels, respective computer channels coupled to said receiver channels, respective cathode follower means in said computer channels including interconnection means rendering said cathode follower means mutually degenerative, said mutually degenerative cathode follower means being operative in response to the instantaneous output signals of said receiver channels to develop a dynamic cutoff signal and to subtract said signal from the respective computer channels for blocking the channels having the weaker signal inputs thereto so that the residual inputs to the channels receiving strong signal inputs sum to a predetermined constant.

References Cited in the file of this patent

UNITED STATES PATENTS

| | | |
|---|---|---|
| 2,427,687 | Norgaard | Sept. 23, 1947 |
| 2,443,098 | Dean | June 8, 1948 |
| 2,485,665 | Shepherd | Oct. 25, 1949 |
| 2,658,139 | Abate | Nov. 3, 1953 |
| 2,697,747 | Baker | Dec. 21, 1954 |